(12) United States Patent
Alken et al.

(10) Patent No.: US 10,974,297 B2
(45) Date of Patent: Apr. 13, 2021

(54) ROLLING STAND FOR THE ROLLING OF ROLLING STOCK

(71) Applicant: SMS Group GmbH, Duesseldorf (DE)

(72) Inventors: Johannes Alken, Siegen (DE); Daniel Knie, Freudenberg (DE)

(73) Assignee: SMS Group GmbH, Duesseldorf (DE)

( * ) Notice: Subject to any disclaimer, the term of this patent is extended or adjusted under 35 U.S.C. 154(b) by 249 days.

(21) Appl. No.: 15/745,481

(22) PCT Filed: Jul. 27, 2016

(86) PCT No.: PCT/EP2016/067898
§ 371 (c)(1),
(2) Date: Jan. 17, 2018

(87) PCT Pub. No.: WO2017/021250
PCT Pub. Date: Feb. 9, 2017

(65) Prior Publication Data
US 2018/0207696 A1    Jul. 26, 2018

(30) Foreign Application Priority Data

Jul. 31, 2015 (DE) .......................... 102015214642.1
Nov. 30, 2015 (DE) .......................... 102015223690.0

(51) Int. Cl.
*B21B 31/07* (2006.01)
*F16C 32/06* (2006.01)

(52) U.S. Cl.
CPC .......... *B21B 31/076* (2013.01); *B21B 31/074* (2013.01); *B21B 2203/24* (2013.01);
(Continued)

(58) Field of Classification Search
CPC ..... B21B 31/07; B21B 31/074; B21B 31/076; B21B 2203/24; B21B 2203/26;
(Continued)

(56) References Cited

U.S. PATENT DOCUMENTS 3,076,524 A * 2/1963 Avallone ............. F16C 32/0644
                                                        184/7.4
3,101,980 A * 8/1963 Love .................... F16C 33/1075
                                                        384/114
(Continued)

FOREIGN PATENT DOCUMENTS

DE    102009012398    9/2010
JP         02112006    1/1990

*Primary Examiner* — Teresa M Ekiert
*Assistant Examiner* — Sarkis A Aktavoukian
(74) *Attorney, Agent, or Firm* — Abelman, Frayne & Schwab; Stefan Knirr

(57) ABSTRACT

The invention relates to a rolling stand for the rolling of metallic rolling stock. The rolling is achieved with the aid of a roll of which the two roll journals (112) are rotatably mounted in recesses (122) of chocks (120). The recesses are supplied with coolant and/or lubricant via a high-pressure inlet (124) and at least one low-pressure inlet (126). The high-pressure inlet is fed via high-pressure conduits (132) from a high-pressure pump (130). To reduce the costs for driving the high-pressure pump in relation to the prior art, the invention provides that the high-pressure pump is rotationally coupled to the roll journal via a gear mechanism in order to be driven thereby.

18 Claims, 4 Drawing Sheets

(52) U.S. Cl.
CPC ....... *B21B 2203/26* (2013.01); *F16C 32/0629* (2013.01); *F16C 2322/12* (2013.01)

(58) Field of Classification Search
CPC ..... B21B 35/147; B21B 15/005; B21B 35/12; B21B 35/143; F16C 41/004; F16C 2361/61; F16C 2322/12; F16N 13/10; F16N 13/20; F16D 1/0876; F16D 2001/103

See application file for complete search history.

(56) References Cited

U.S. PATENT DOCUMENTS

| | | | |
|---|---|---|---|
| 3,422,650 A * | 1/1969 | Strance | B21B 31/074 72/12.7 |
| 3,453,031 A | 7/1969 | Rickley | |
| 3,769,826 A * | 11/1973 | Lauener | B21B 13/20 72/191 |
| 3,815,709 A * | 6/1974 | Rosenthal | B21B 35/147 184/6.28 |
| 6,692,689 B2 * | 2/2004 | Morando | C23C 2/00 118/423 |
| 7,461,532 B2 | 9/2008 | Wojtkowski | |
| 9,016,099 B2 | 4/2015 | Williams | |
| 9,623,458 B2 | 4/2017 | Grimmel | |

* cited by examiner

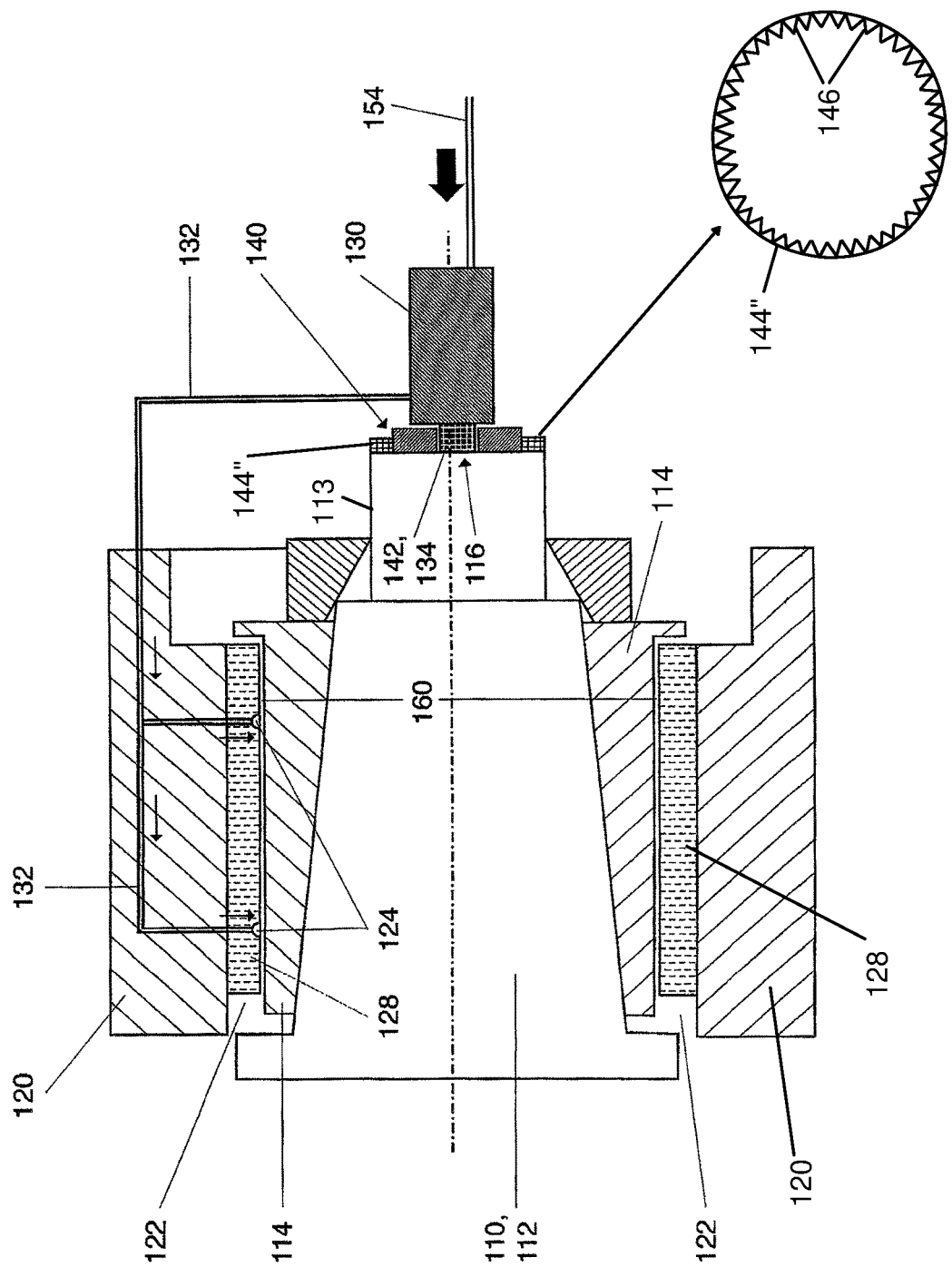

ROLLING STAND FOR THE ROLLING OF ROLLING STOCK

RELATED APPLICATIONS

This application is a National Stage application of International Application PCT/EP2016/067898 filed Jul. 27, 2016 and claiming priority of German Application DE 10 2015 214 642.1 filed Jul. 31, 2015 and German Application DE 10 2015 223690.0 filed Nov. 30, 2015; all three applications are incorporated herein by reference thereto.

The invention relates to rolling of, preferably, metallic rolling stock. Such rolling stands are basically known in the state-of-the art, e.g., from WO2013/048836 A1. The described rolling stand for rolling of metallic rolling stock has a roll with two roll journals each rotatably supported in a respective chock, which is also called a bearing housing. In highly loaded stands, the roll journal is supported in a cylindrical receiving space in the respective chock, wherein the receiving space in the chock in the region of the maximum load has at least one high-pressure inlet, typically with hydrostatic pockets, for coolant and/or lubricant in the receiving space. In addition, the known rolling stand is provided, on its inlet side, with a high-pressure pump connected to a low-pressure circuit for coolant and/or lubricant. The pump is mounted on top of the rolling stand and feeds from there through the high-pressure conduits, the coolant and/or lubricant under high pressure to the high-pressure inlet of the chock. The high-pressure inlet is provided in the wall of the receiving space or in the wall of a bearing sleeve of the chock in the region of the maximum load. The mentioned low-pressure circuit for the coolant and/or lubricant includes a low-pressure pump and a tank for the coolant or lubricant which usually are arranged below the rolling stand. Low-pressure conduits which usually extend along the stand windows of the rolling stand, connect the low-pressure pump with low-pressure inlets in the receiving space of the chock for the roll journal, wherein the low-pressure inlet usually provided in 90° and 270° positions over the circumference of the receiving space. The supply of the receiving space or the annular gap between the chock and the roll journal supported therein with the coolant and/or lubricant under low pressure, e.g., 2 bar, as a rule, is sufficient for lubrication of the roll journal at a smaller rolling force.

At larger rolling forces, which particularly occur in the first rolling stand of a rolling train, the low pressure, however, as a rule, is not sufficient to provide separation, i.e., to lift the roll journal from the chock or the bearing sleeve during the rolling operation, which results in that the roll journal contacts the chock or the bearing sleeve and rubs against the inner surface of the receiving space upon rotation. The result is an undesirable wear of both the bearing sleeve and the journal. To prevent this, according to the state-of-the art, the above-mentioned high-pressure pump is provided which is supplied, on its inlet side, over low-pressure conduits, with the same coolant and/or lubricant that is used in the low-pressure circuit. The high-pressure pump puts the fed coolant and/or lubricant, on its outlet side, under a high pressure, typically, greater than 1,000 bar, preferably, 1,500 bar. From the pump, the coolant and/or lubricant is pressed, over the high-pressure conduits, through the above-mentioned high-pressure inlet, which, as mentioned, is located in the region of the maximum load in the receiving space, in the annular gap between the roll journal and the chock. With the high pressure, it is possible to separate the roll journal and, thereby, the roll from the chock even at high rolling forces and to provide for sliding of the roll journal quasi friction-free on a film formed from the coolant and/or lubricant even under a high load.

However, the arrangement of the high-pressure pump on the rolling stand disclosed in WO 2013/048836 is not reasonable for various reasons:

Firstly, the necessary high-pressure conduits for connecting the outlet side of the high-pressure pump positioned on the top of the rolling stand, with the high-pressure inlets in the chock are relatively long. Further, an external drive for the high-pressure pump is needed and which also has to be positioned on the top of the rolling stand. Electrical and hydraulic supply lines for the drive must be extended toward the top of the rolling stand.

The object of the invention is to so modify the known rolling stand for rolling of rolling stock that the costs for the drive of the high-pressure pump can be reduced.

This object is achieved by providing a drive connection on a side of the chock remote from a roll face for drivingly connecting the high-pressure pump with the roll journal rotatably supported in the receiving space.

The advantage of the above-mentioned drive connection consists in that the high-pressure pump is driven by the roll journal when the latter is rotated. Thereby, a separate drive, usually an electric motor for the high-pressure pump becomes unnecessary; its costs as well as the costs of electrical and hydraulic supply lines for the drive can be eliminated.

According to a first embodiment, the drive connection is formed as a gear drive having a pinion and a drive gear rotationally connected directly or indirectly with each other. The pinion is mounted on a free end of a drive shaft of the high-pressure pump for joint rotation therewith, or the free end of the drive shaft is formed as a pinion. According to the first embodiment of the drive connection, the drive gear is formed as an externally toothed ring gear preferably connected with the roll journal or with a bearing sleeve fixedly mounted on the roll journal for joint rotation therewith on the side remote from the roll face. The high-pressure pump is so arranged that the drive shaft pinion preferably directly, i.e., without interposition of another gear, engages the externally toothed ring gear. In case a certain transmission ratio is necessary, naturally further gears can be interposition therebetween. In particular, in the above-mentioned first embodiment of the drive connection, the high-pressure pump can be advantageously mounted, in a space-saving manner, in a recess formed in the chock.

According to a second embodiment of the drive connection, the drive gear is formed as an internally toothed gear ring connected with the roll journal, preferably coaxially therewith for joint rotation therewith on an end side of the roll journal remote from the roll face, and the high-pressure pump is so arranged on the end side of the roll journal that the drive shaft pinion engages, preferably directly, the internally toothed gear ring.

The fact that the pinion directly engages the drive gear, means that the pinion teeth engage the drive gear toothing. An indirect engagement means that the pinion and the drive gear are rotationally connected by a chain or interposition of further gears, or in a similar manner.

In addition to the high-pressure inlet, there is provided, in the chock receiving space, at least one low-pressure inlet which is supplied from a low-pressure circuit for the coolant and/or lubricant. The low-pressure circuit has a low-pressure pump and at least one low-pressure conduit with a manifold for supplying the coolant and/or lubricant to both the low-pressure inlet and to the inlet side of the high-pressure pump.

The manifold of the low-pressure conduit for the low-pressure inlet and the high-pressure pump can be arranged outside of the chock at the chock level, immediately on the low-pressure conduit which extends along the stand of the rolling stand. In this case, two low-pressure conduits extend from the manifold into the chock.

Alternatively, the manifold can be arranged inside the chock. In this case, only one low-pressure conduit extends from the low-pressure circuit in the chock. In the chock, this conduit branches toward the low-pressure inlet and the high-pressure pump. The second embodiment has an advantage which consists in that, as mentioned above, only one low-pressure conduit extends in the chock, whereby at a roll change, only this conduit need be separated or disconnected. The danger that one conduit would not be reconnected upon exchange is thereby reduced.

When the chock is provided with a bearing sleeve as a wear part and which spans the receiving space, then both the low-pressure and the high-pressure inlets for the coolant and/or lubricant are formed in the bearing sleeve. These inlets are then connected in a fluid-conducting manner by corresponding channels in the chock.

The invention will now be described with referenced to six figures, wherein.

Figure 5:
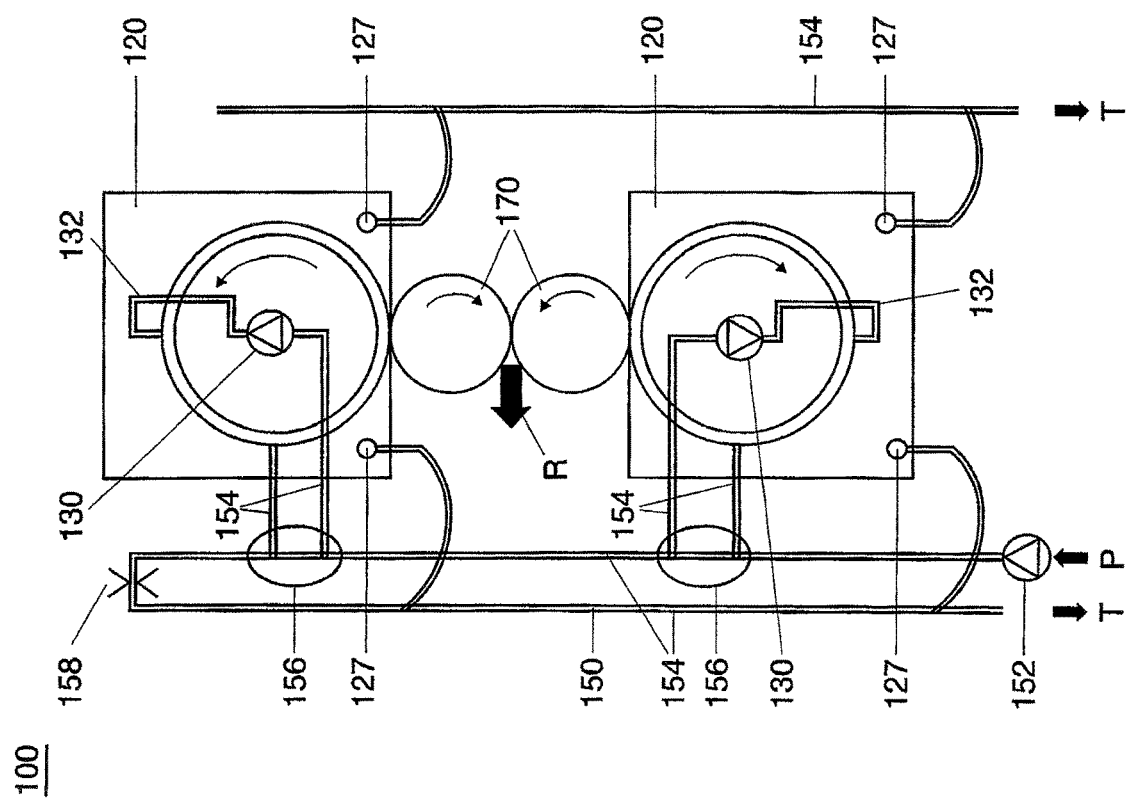

FIG. 5 shows a rolling stand according to the invention with a second embodiment of connection of a high-pressure pump with a low-pressure conduit, with the high-pressure in a second mounting position; and FIG. 6 shows a longitudinal cross-sectional view of the chock with roll journals supported therein and with a second embodiment of a gear drive for driving the high-pressure pump in the first mounting position.

FIG. 6A shows an enlarged axial view of the gear ring of the embodiment of FIG. 6.

The invention will be described in detail below with reference to the drawings by way of examples.

Figure 1:
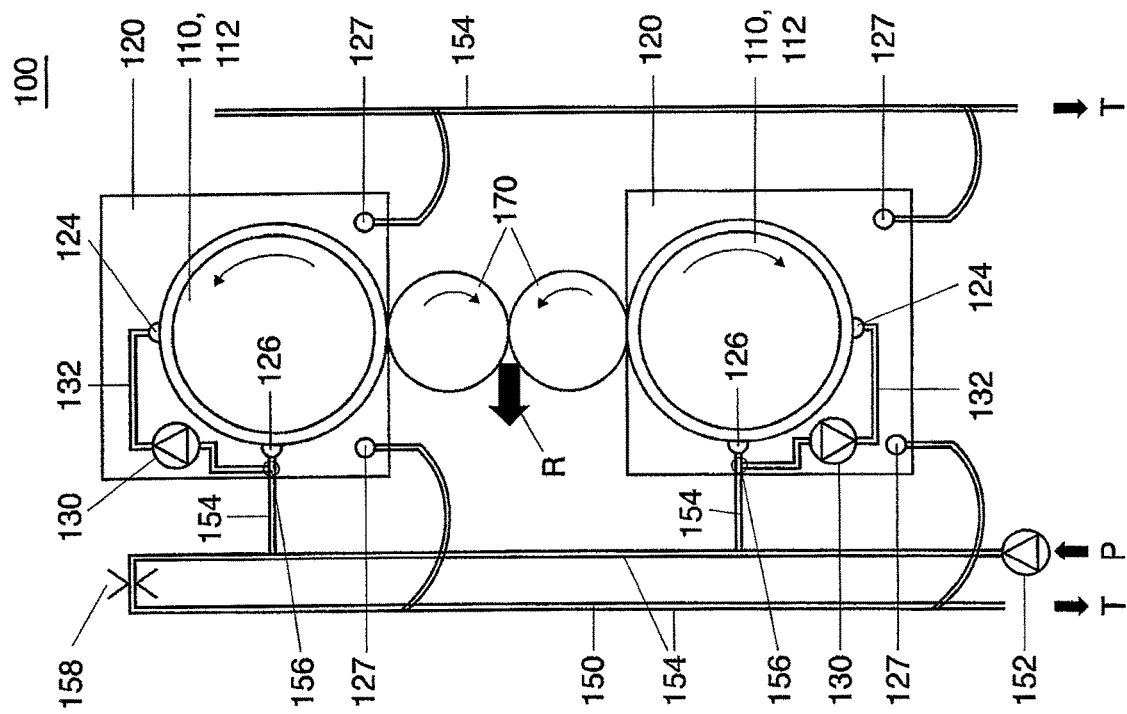
FIG. 1 shows a rolling stand according to the invention with a first embodiment of connection of a high-pressure pump with a low-pressure conduit, with the high-pressure pump in a first mounting position.

FIG. 1 shows schematically a rolling stand according to the invention in form of a four-high rolling stand, i.e., with four rolls arranged one above the other. The two middle rolls are work rolls 170 which typically define a rolling gap through which a rolling stock is forwarded in a rolling direction R and is rolled. The two work rolls 170 are supported by a respective back-up roll (110). The back-up rolls are rotatably supported in chocks 120 by their respective roll journals 112. The chock 120, which is also called a bearing housing, has a cylindrical and, in many cases, a conical receiving space 122 in which a respective roll journal 112 is rotatably supported. Optionally, the receiving space 122 can be surrounded by bearing sleeve 128 which is fixedly secured in the chock. Between the chock 120 or the bearing sleeve 128 and the roll journal 112, optionally, with a journal sleeve mounted on the roll journal, an annular gap is formed that during operation of the rolling stand, is filled with coolant and/or lubricant. For supplying the annular gap with the coolant and/or lubricant, there are provided, on the periphery of the receiving space 122 inlets and outlets for receiving the coolant and/or lubricant. In the region of a maximum load, at least one high-pressure inlet 124 is provided for the coolant and/or lubricant which is injected by a high-pressure pump 130 as necessary, at high pressure, typically greater than 1,000 bar, preferably 1,500 bar into the annular gap. In addition to the high-pressure inlet 124, there is provided at least one low-pressure inlet 126 which generally is arranged in a region of 90° or 270°.

In order to supply the above-mentioned low-pressure inlet 126 as well as the inlet side of the high-pressure pump 130 with the coolant or lubricant, a low-pressure circuit 150 is associated with the rolling stand 100. The low-pressure circuit 150 includes a low-pressure pump 152 for supplying the coolant or lubricant under a low pressure, e.g., from 1 to 10 bar, preferably, under 2 bar. The low-pressure pump 152 pumps the coolant and/or lubricant from a tank which is usually located beneath the rolling stand, in a low-pressure conduit 154. According to the first embodiment shown in FIG. 1, at a height of each of the chocks 120, outside of the chocks 120, two low-pressure lines 154 branch from the low-pressure conduit 154 and extend in the respective chocks 120 for supplying the inlet side of the high-pressure pump 130 and the low-pressure inlet 126 with the low-pressure coolant and/or lubricant.

A pressure regulator 158 controls the necessary initial pressure in the low-pressure conduit 154 which is connected with the respective chock.

In addition to the inlets 124, 126, there is provided, in the chock 120, and outlet 127 which is connected with the tank by a return conduit.

As shown in FIG. 1, the high-pressure pump 130 is provided in the chock 120 or at least in the region of the chock 120. The same applies for both the chock of the upper support roll and the lower support roll. According to the invention, the high-pressure pump 130 is driven from the roll journal 112 of the back-up roll 110 when the support roll rotates. Details of the inventive rotary drive will be discussed below when reference to FIG. 3.

Figure 2:
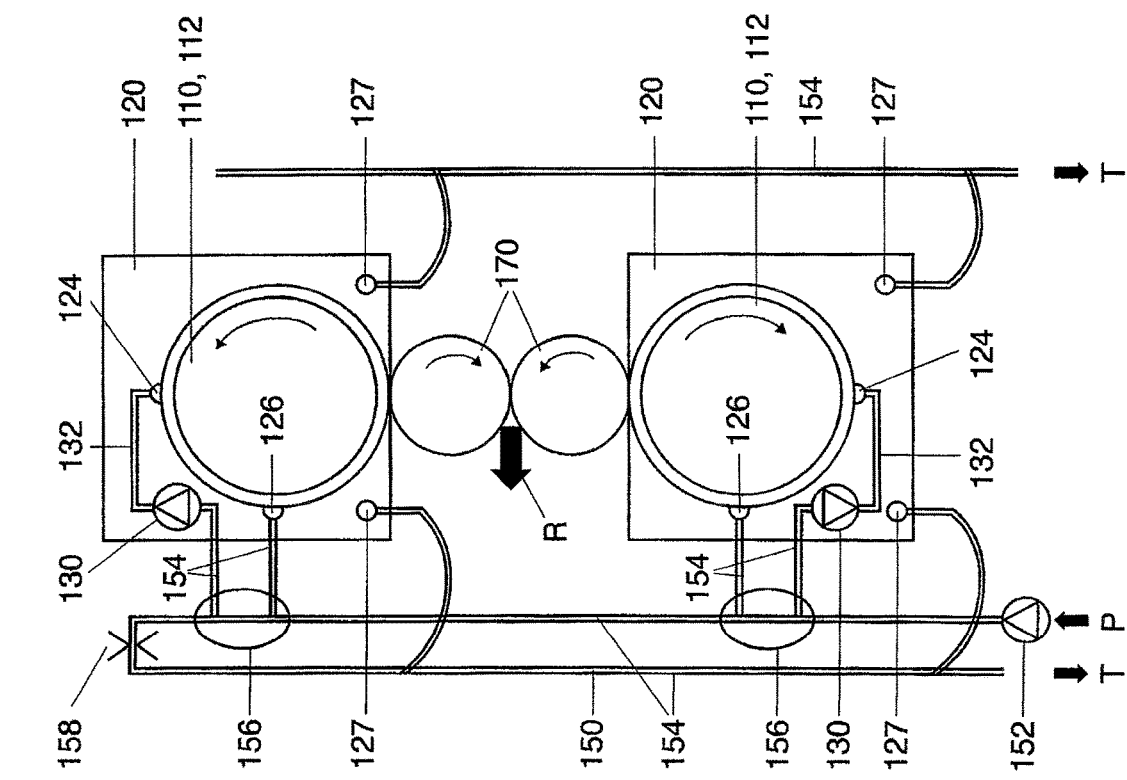
FIG. 2 shows a rolling stand according to the invention with a second embodiment of connection of a high-pressure pump with a low-pressure conduit, with the high-pressure pump in a first mounting position.

FIG. 2 shows substantially the same rolling stand 100 which was described with reference to FIG. 1. The single difference consists in that the FIG. 2 shows a second embodiment of attachment of the chock 120 and, in particular, of the high-pressure pump 130 to the low-pressure conduit 154. In the second embodiment, not two low-pressure conduits 154 but only one low-pressure conduit 154 extends into the chock 120, and a manifold 156 is provided in the chock 120 and from which a low-pressure conduit for the coolant and/or lubricant branches to the low-pressure inlet 126 and the inlet side of the high-pressure pump 130. In this way, a single low-pressure entry per the chock 120 not only reduces costs associated with a one-time installation of the second low-pressure conduit but also reduces follow-up costs associated with a need to disconnect only one but not two low-pressure conduits from the chock when a back-up roll is changed and to reconnect one and not two conduits to the chock when a new back-up roll is installed.

Figure 3:
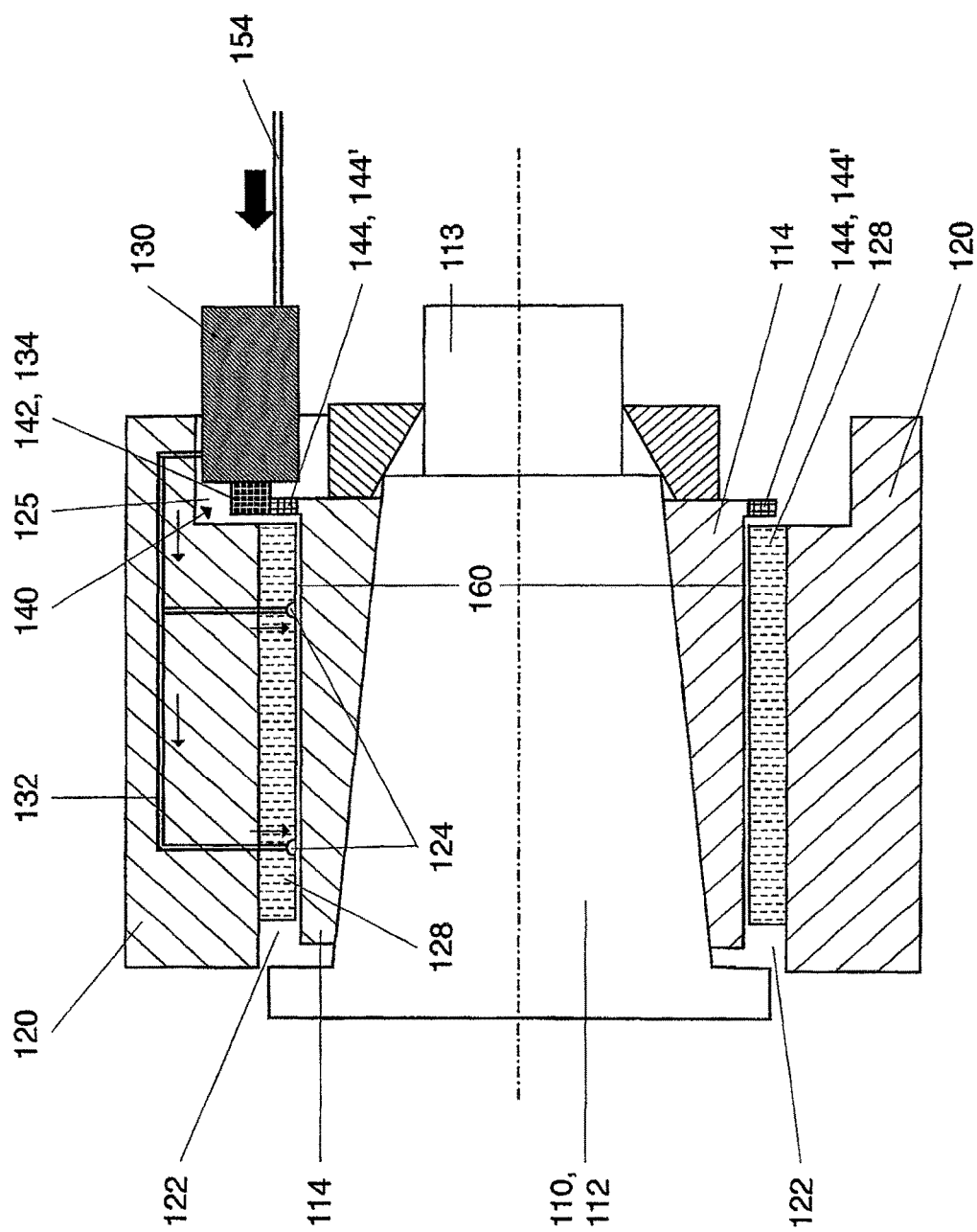
FIG. 3 shows a longitudinal cross-sectional view of the chock with roll journals supported therein and with a first embodiment of a gear drive for driving the high-pressure pump in the first mounting position.

FIG. 3 show a longitudinal cross-sectional view of the chock 120 with roll journals 112 of the back-up roll 110 supported therein and with a first embodiment of an inventive drive connection between the high-pressure pump and the roll journal. It is shown that the high-pressure pump 130 is so mounted in a recess 125 in the chock 120 that its drive shaft 134 extends preferably parallel to the longitudinal axis of the back-up roll 110. An outwardly projecting free end of the drive shaft 134 is formed as a gear wheel or a pinion 142 is fixedly secured on the drive shaft. In the embodiment of the first drive connection shown in FIG. 3, the pinion 142 or the gear wheel of the drive shaft directly engages an outer toothing of a gear ring 144' of the drive gear 144 which is coaxially and fixedly mounted on a side of the roll journal or on a journal bushing 114 remote from the roll face. In this case, the drive connection 140 consists of the pinion 142 and the drive gear 144, with the pinion 142 directly engaging the outer toothing of the gear ring 144 of the drive gear 144. Alternatively, the drive connection 140 may include and indirect connection of the pinion 142 with the drive gear 144, e.g., via a chain, or intermediate drive gears. The shown mounting of the high-pressure pump 130 in the recess 125 of the chock 120 represents a very compact mounting that is very accommodating for basically always cramped space in the field of rolling stands.

FIG. 3 shows that the inlet side of the high-vacuum pump is connected with the low-pressure conduit 154. On its outlet side, the high-pressure pump 130 pumps the coolant and/or lubricant through high-pressure conduits 132 into high-pressure inlets in the annular gap between the bearing sleeve 128 and the journal bushing 114. The high-pressure conduits 132 are formed in the interior of the chock 120.

Figure 4:
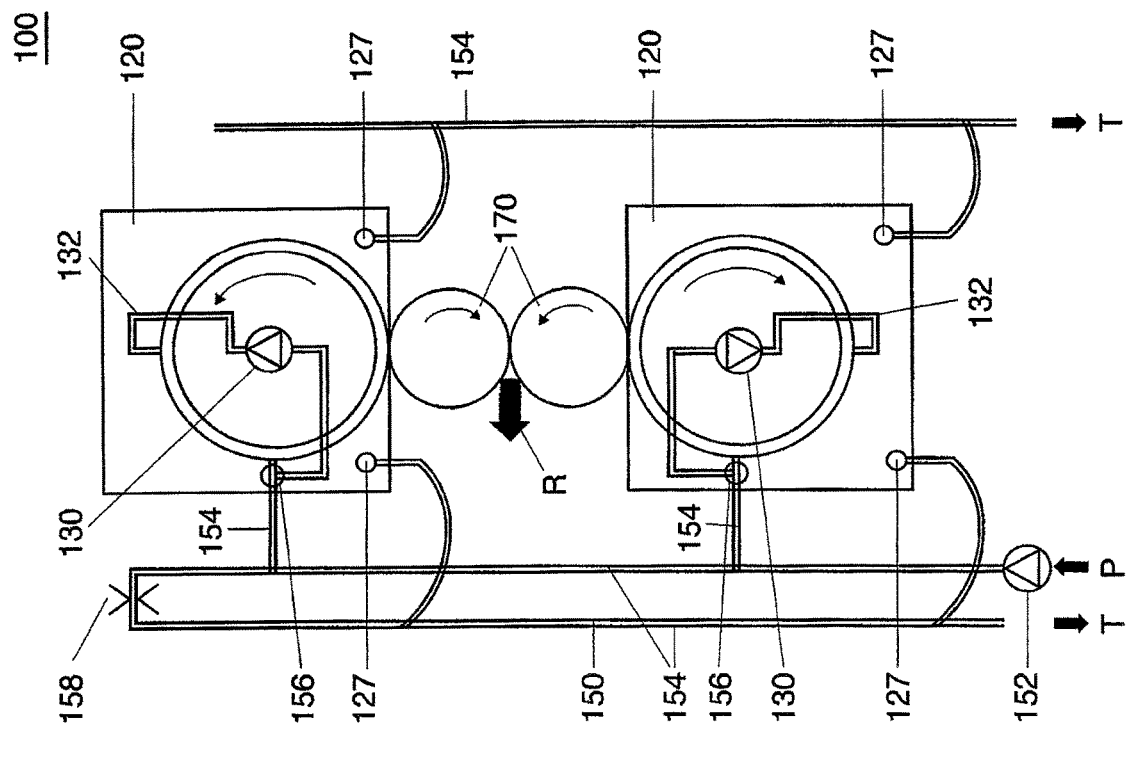
FIG. 4 shows a rolling stand according to the invention with a first embodiment of connection of a high-pressure pump with a low-pressure conduit, with the high-pressure in a second mounting position.

FIG. 4 essentially corresponds to FIG. 1 with a single difference that consists in a different position of the high-pressure pump, namely, at the end side of the roll journal 112 of the back-up roll 110, as it will be described in more detail with reference to FIG. 6.

FIG. 5 essentially corresponds to FIG. 2 with a single difference that likewise consists in different position of the high-pressure pump 130, namely, at the end side of the roll journal, see the following description with reference to FIG. 6.

FIG. 6 shows a longitudinal cross-sectional view of the chock 120, with roll journal 112 of the back-up roll 110 supported therein.

In distinction from FIG. 3, here, the high pressure pump 130 is arranged, as shown in FIGS. 4 and 5, at the end side of the roll journal 112 remote from the roll face. The pinion 142 on the drive shaft 134 of the high-vacuum pump 130, here, is directly connected with the roll journal 112 by the gear ring 144" with inner toothing 146 of the drive gear 144, as illustratively shown in FIG. 6A. The drive gear preferably is concentrically secured on the end side of the roll journal 112 for joint rotation therewith. More specifically, the drive gear 144 is formed as an internally toothed annular gear ring 144" connected with the roll journal 112 for joint rotation therewith on an end side 116 of the roll journal 112 remote from the roll face, and the high-pressure pump 130 is so arranged on the end side of the roll journal 112 that the drive shaft pinion 142 engages, preferably directly, the teeth 146 of the internally toothed gear ring 144".

LIST OF REFERENCE NUMERALS

100 Rolling stand
110 Back-up roll
112 Roll journal of the back-up roll
113 Roll journal end
114 Journal sleeve
116 Remote form the roll face
120 Chock
122 Receiving space
124 High-pressure inlet
125 Recess in the chock
126 Low-pressure inlet
127 Outlet
128 Bearing Sleeve
130 High pressure pump
132 High-pressure conduit
134 Drive shaft of the high-pressure pump
140 Drive connection
142 Pinion
144 Drive gear
144' Ring gear with external toothing
144" Ring gear with internal toothing
150 Low-pressure inlet
152 Low-pressure pump
154 Low-pressure conduit
156 Manifold
158 Pressure regulator
160 Annular gap
170 Work roll
T Low-pressure conduit form the rolling stand to tank
P Low-pressure conduit from the tank to the rolling stand
R Rolling direction

The invention claimed is:

1. A rolling stand for rolling a metallic rolling stock, comprising:
    a roll having two roll journals;
    two chocks each having a cylindrical receiving space for rotationally supporting the respective roll journal of the roll, wherein the receiving space has at least one high-pressure inlet for coolant and/or lubricant at least in one of the two chocks in a region of a maximum load;
    at least one high-pressure pump associated with the at least one of the two chocks, wherein the at least one high-pressure pump has a drive shaft;
    a high-pressure conduit for connecting an outlet side of the high-pressure pump with the at least one high-pressure inlet for feeding the coolant and/or lubricant into the receiving space; and
    drive means provided on a side of the at least one of the two chocks remote from a roll face, wherein the drive means connect the drive shaft of the at least one high-pressure pump with the respective roll journal, such that rotation of the roll journal causes a rotation of the drive shaft of the at least one high-pressure pump, wherein the drive means comprises a gear drive having a pinion and a drive gear connected with the respective roll journal for joint rotation therewith and rotationally connected directly or indirectly with each other, and in that the pinion is mounted on a free end of the drive shaft of the high-pressure pump for joint rotation therewith, or the free end of the drive shaft is formed as the pinion, and
    the drive gear is an externally toothed ring gear connected with the respective roll journal or with a bearing sleeve fixedly mounted on the respective roll journal for joint rotation therewith on the side thereof remote from the roll face, and the high-pressure pump is arranged that the drive shaft pinion directly engages the externally toothed ring gear.

2. The rolling stand according to claim 1, wherein the high-pressure pump is integrated in the at least one of the two chocks.

3. The rolling stand according to claim 2, wherein the high-pressure pump is mounted in a recess formed in the at least one of the two chocks.

4. The rolling stand according to claim 1, wherein the at least one of the two chocks has at least one low-pressure inlet for the coolant and/or lubricant.

5. The rolling stand according to claim 4, wherein the at least one of the two chocks has a bearing sleeve connected therewith for joint rotation and which spans the receiving space, and wherein the at least one low-pressure inlet and the high-pressure inlet for the coolant and/or lubricant are provided in the receiving space in the bearing sleeve.

6. The rolling stand according to claim 4 further comprising a low-pressure circuit having a low-pressure pump and at least one low-pressure conduit with a manifold for supplying the coolant and/or lubricant, at a low pressure, to both the low-pressure inlet and to an inlet side of the high-pressure pump.

7. The rolling stand according to claim 6, wherein the manifold is positioned outside of the at least one chock at the height of the at least one of the two chocks as a part the low-pressure conduit which extends along a frame of the rolling stand.

8. The rolling stand according to claim 6, wherein the at least one low-pressure conduit extends into the at least one of the two chocks, and the manifold communicates with the low-pressure inlet and the high-pressure inlet and is positioned within the at least one of the two chocks.

9. The rolling stand according to claim 6, wherein the low pressure is in a range of 1-10 bar.

10. A rolling stand for rolling a metallic rolling stock, comprising:
    a roll having two roll journals;
    two chocks each having a cylindrical receiving space for rotationally supporting the respective roll journal of the roll, wherein the receiving space has at least one high-pressure inlet for coolant and/or lubricant at least in one of the two chocks in a region of a maximum load;
    at least one high-pressure pump associated with the at least one of the two chocks, wherein the at least one high-pressure pump has a drive shaft;
    a high-pressure conduit for connecting an outlet side of the high-pressure pump with the at least one high-pressure inlet for feeding the coolant and/or lubricant into the receiving space; and
    drive means provided on a side of the at least one of the two chocks remote from a roll face, wherein the drive means connect the drive shaft of the at least one high-pressure pump with the respective roll journal, such that rotation of the roll journal causes a rotation of the drive shaft of the at least one high-pressure pump, wherein the drive means comprises a gear drive having a pinion and a drive gear connected with the respective roll journal for joint rotation therewith and rotationally connected directly or indirectly with each other, and in that the pinion is mounted on a free end of the drive shaft of the high-pressure pump for joint rotation therewith, or the free end of the drive shaft is formed as the pinion, and
    the drive gear comprises an internally toothed gear ring connected with the respective roll journal for joint rotation therewith on an end side of the respective roll journal remote from the roll face, and the high-pressure pump is arranged on the end side of the respective roll journal that the drive shaft pinion directly engages the internally toothed gear ring.

11. The rolling stand according to claim 10, wherein the high-pressure pump is integrated in the at least one of the two chocks.

12. The rolling stand according to claim 11, wherein the high-pressure pump is mounted in a recess formed in the at least one of the two chocks.

13. The rolling stand according to claim 10, wherein the at least one of the two chocks has at least one low-pressure inlet for the coolant and/or lubricant.

14. The rolling stand according to claim 13 further comprising a low-pressure circuit having a low-pressure pump and at least one low-pressure conduit with a manifold for supplying the coolant and/or lubricant, at a low pressure, to both the low-pressure inlet and to an inlet side of the high-pressure pump.

15. The rolling stand according to claim 14, wherein the manifold is positioned outside of the at least one of two chocks at the height of the at least one of two chocks as a part the low-pressure conduit which extends along a frame of the rolling stand.

16. The rolling stand according to claim 14, wherein the at least one low-pressure conduit extends into the at least one of two chocks, and the manifold communicates with the low-pressure inlet and the high-pressure inlet and is positioned within the at least one of two chocks.

17. The rolling stand according to claim 14, wherein the at least one of two chocks has a bearing sleeve connected therewith for joint rotation and which spans the receiving space, and wherein the at least one low-pressure inlet and the high-pressure inlet for the coolant and/or lubricant are provided in the receiving space in the bearing sleeve.

18. The rolling stand according to claim 14, wherein the low pressure is in a range of 1-10 bar.

* * * * *